United States Patent [19]
Frey

[11] 3,913,207
[45] Oct. 21, 1975

[54] METHOD OF MAKING SEALED TUBES

[76] Inventor: Roberto José Frey, 450, Guapore Str., Sao Paulo, Brazil

[22] Filed: Apr. 16, 1974

[21] Appl. No.: 461,387

[52] U.S. Cl. .................. 29/413; 29/414; 72/324; 72/338; 137/800; 138/96 R
[51] Int. Cl.² .................................. B23P 17/00
[58] Field of Search ............ 29/413, 412, 414, 417; 72/324, 338; 138/96 R; 137/800

[56] References Cited
UNITED STATES PATENTS

| | | | |
|---|---|---|---|
| 2,005,306 | 6/1935 | Wallis | 72/338 X |
| 2,222,842 | 11/1940 | Humphrey | 29/413 X |
| 2,430,995 | 11/1947 | Roos | 29/414 X |
| 2,741,023 | 4/1956 | Rafter | 29/413 |
| 3,334,407 | 8/1967 | DeSantis | 29/414 X |

*Primary Examiner*—Victor A. DiPalma
*Attorney, Agent, or Firm*—Michael S. Striker

[57] ABSTRACT

A tube is made for installation in a system wherein the tube is to confine a fluid and to protect it from pollution. Promptly upon the making of the tube, both of its end portions are sealed by swaging them closed. Thereafter, the tube has two circumferential grooves formed on its outer surface, each inwardly adjacent one of the sealed end portions. Promptly before the installation of the tube in a system wherein it is to confine and protect a fluid, the sealed end portions are broken off at said grooves by twisting these portions with reference to the remainder of the tube.

5 Claims, 3 Drawing Figures

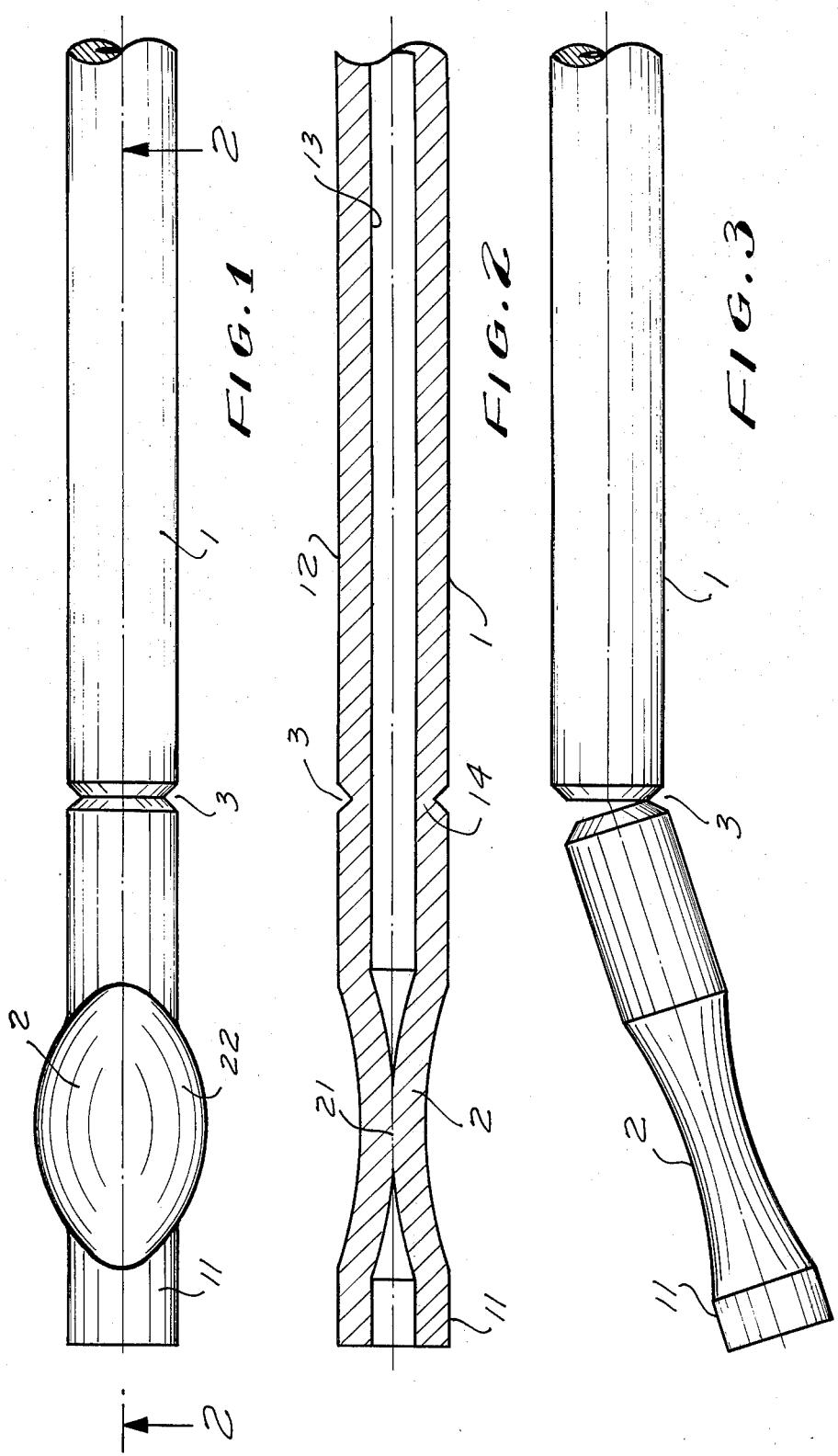

METHOD OF MAKING SEALED TUBES

BACKGROUND OF THE INVENTION

This invention relates to the making of tubes for sealed systems confining fluids and protecting them from pollution, for example the making of capillary tubes for refrigerating systems. For such systems it is important that the internal surfaces of the tube be fully protected against any entry of foreign matter, including atmospheric moisture, oxygen and the like, as even traces of pollution can harm the fluid circulating in the system. Prior attempts have been made to prevent pollution of a tube between the time when its manufacture was complete and the time when the tube was to be installed, but prior methods for this purpose were either of limited effectiveness or of excessive complexity and cost.

SUMMARY OF THE INVENTION

An object of the invention is to produce and use sealed tubes so as to avoid the former difficulties.

It is a further object to produce sealed tubes safely sealed from pollution and which nevertheless are easy to install.

For these purposes the invention provides a new method wherein, upon the production of a tube, both end portions of the tube are sealed, for example by swaging; outer surfaces of the tube then have two circumferential grooves formed therein at locations inwardly spaced from the sealed end portions; and promptly before the installation of the tube the sealed end portions are removed by breaking them off at said grooves, preferably by twisting the end portions with reference to the remainder of the tube.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a plan view of a portion of a tube produced according to the invention;

FIG. 2 is a section view taken along line 2—2 in FIG. 1; and

FIG. 3 is a side view of the tube illustrating a certain position in the performance of the new method.

DESCRIPTION OF THE PREFERRED EMBODIMENTS:

Tube 1 is produced, for example of copper or other suitable metal, the process of producing the tube being known to persons skilled in the art. Tube 1 and end portions 11 thereof are produced with reasonably clean outer surfaces 12 and with meticulously clean inner surfaces 13. Promptly thereafter a portion 2 of each end portion 11 is sealed. As shown in FIGS. 1 and 2, this may be done by swaging a short length of end portion 11 so as to weld inside surface portions into a hermetically sealed section 21. The swaging also laterally displaces portions of the metal, forming a widened section 22.

In accordance with the invention a peripheral groove 3 is then formed on the outer surface of the tube inwardly adjacent each end portion 11, for example by cutting deeply into the metal of the tube from this outer surface but not cutting through the metal to the inner surface 13; a thin peripheral metal section 14 is left intact so as to avoid the entrance of polluting matter while the tube is stored or handled.

Directly prior to the installation of tube 1 in the system wherein it is to confine a fluid and to protect it from pollution, end portions 11 are removed from the remainder of the tube. Their removal is facilitated by the existence of the preformed groove 3. The removal of the end portions can be performed by simply twisting the end portions with reference to the remainder of the tube. For this purpose such a portion can be manually held at the swaged and widened section 22.

By this method the internal surface 13 of tube 1 is protected from contact with foreign matter, such as oxidizing portions of the atmosphere, until the very moment when the tube is to be installed in the system wherein the tube is to confine fluid and to protect it from pollution.

It will be understood that each of the elements described above, or two or more together, may also find a useful application in other types of constructions differing from the types described above.

While the invention has been illustrated and described as embodied in a method of making sealed tubes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims:

1. A method of making hermetically sealed capillary tubes for installation in fluid systems, particularly refrigeration systems requiring pollution-free plumbing, comprising the steps of making a seamless capillary tube having an outer and an inner circumferential surface, an axis, and opposite end portions, said inner circumferential surface being free of pollutants; immediately sealing said end portions by shaping a longitudinal section thereof into a widened section so that opposite inner circumferential surface portions located on opposite sides of said axis are brought into direct contact with one another, thereby hermetically sealing the interior of said pollution-free tube; scoring said outer circumferential surface of said tube with two circumferential grooves, each of said grooves being inwardly adjacent a respective one of said end portions; and removing said sealed end portions by breaking the latter off at said grooves from the remainder of said tube immediately prior to installation of said tube in the fluid system.

2. A method as defined in claim 1, wherein said step of sealing is performed by swaging said outer circumferential surface of said tube.

3. A method as defined in claim 2, wherein said step of swaging is performed prior to said step of scoring said grooves.

4. A method as defined in claim 1 wherein said step of scoring said grooves includes cutting deeply into said outer surface but leaving a thin peripheral section of the tube surrounded by each groove.

5. A method as defined in claim 6 wherein said step of removing said end portions is performed by twisting them off from the remainder of the tube.

* * * * *